United States Patent [19]
Giacometti et al.

[11] Patent Number: 5,819,421
[45] Date of Patent: Oct. 13, 1998

[54] POWERED JIG SAW

[75] Inventors: Massimo Alberto Giacometti, Valmadrener, Italy; Reimund Becht, Hunfelden, Germany

[73] Assignee: Black & Decker Inc., Newark, Del.

[21] Appl. No.: 807,092

[22] Filed: Feb. 27, 1997

[30] Foreign Application Priority Data

| Mar. 1, 1996 | [DE] | Germany | 196 09 396.1 |
| Jan. 7, 1997 | [GB] | United Kingdom | 9700206 |

[51] Int. Cl.⁶ .................................................. B27B 19/09
[52] U.S. Cl. ................................................ 30/392; 30/393
[58] Field of Search .......................... 30/392, 393, 394; 83/776

[56] References Cited

U.S. PATENT DOCUMENTS

| 2,639,737 | 5/1953 | Forsburg . | |
| 2,705,980 | 4/1955 | Papworth . | |
| 2,917,088 | 12/1959 | Papworth . | |
| 2,931,402 | 4/1960 | Papworth . | |
| 2,961,016 | 11/1960 | Papworth . | |
| 3,890,708 | 6/1975 | Bauer . | |
| 4,238,884 | 12/1980 | Walton, II | 30/393 |
| 4,351,112 | 9/1982 | Nalley | 30/392 |
| 4,385,443 | 5/1983 | O'Banion . | |
| 4,884,344 | 12/1989 | Martinez et al. . | |
| 5,170,564 | 12/1992 | Kaiser | 30/393 |
| 5,205,043 | 4/1993 | Batt et al. . | |
| 5,212,887 | 5/1993 | Farmerie . | |
| 5,306,025 | 4/1994 | Langoff . | |
| 5,322,302 | 6/1994 | Quirijnen . | |
| 5,324,052 | 6/1994 | Ortmann . | |
| 5,340,129 | 8/1994 | Wright . | |
| 5,392,519 | 2/1995 | Inoue . | |
| 5,421,232 | 6/1995 | Laverick | 30/394 |
| 5,450,925 | 9/1995 | Smith et al. . | |
| 5,458,346 | 10/1995 | Briggs . | |
| 5,487,221 | 1/1996 | Oda et al. . | |
| 5,661,909 | 9/1997 | Kondo et al. | 30/392 |

FOREIGN PATENT DOCUMENTS

| 0679464 | 11/1995 | European Pat. Off. . |
| 0679465 | 11/1995 | European Pat. Off. . |
| 2650470 | 5/1978 | Germany . |
| 3543764 | 6/1986 | Germany . |
| 8633351 | 3/1987 | Germany . |
| 3608301 | 9/1987 | Germany . |
| WO8908524 | 9/1989 | WIPO . |

*Primary Examiner*—Hwei-Siu Payer
*Attorney, Agent, or Firm*—Dennis A. Dearing; John D. Del Ponti; Bruce S. Shapiro

[57] ABSTRACT

A powered jig saw comprises a holder for a saw blade at the lower end of the reciprocating drive shaft. The holder is adjustable, by rotation of an actuating section, between an open position and a closed position for holding the saw blade. The actuating section comprises, in the interior of an upwardly open tube portion of the drive shaft, an engagement surface which, for the purpose of rotating the actuating section, engages with a working surface of a rotatable adjustment device which is stationary when the drive shaft is driven. The upper end portion of the drive shaft is mounted, so as to be capable of axial displacement, in a guide bush, above which there is a holding device of the adjustment device, in which holding device there is fixed a downwardly extending element comprising the working surface. A pendulum mechanism serves to generate a swivelling movement of the drive shaft. The guide bush, for the purpose of accommodating the swivelling movement of the drive shaft generated by the pendulum mechanism, is pivotally mounted within the housing and the holding device is supported on the guide bush and held in engagement therewith by spring force. In this way, tilting or swivelling of the engagement surface of the actuating section relative to the working surface of the adjustment device during the pendulum operation is prevented.

7 Claims, 5 Drawing Sheets

POWERED JIG SAW

BACKGROUND OF THE INVENTION

The invention relates to a powered jig saw with a housing in which, near its front end, there is disposed a drive shaft comprising at its lower end a holder for a saw blade, and there is also disposed a drive motor which is coupled with the drive shaft to generate a reciprocating movement of the latter in the direction of its longitudinal axis, the holder being adjustable, by rotation of an actuating section, between an open position and a closed position for holding the saw blade and the actuating section comprising, in the interior of an upwardly open tube portion of the drive shaft, an engagement surface which, for the purpose of rotating the actuating section, engages with a working surface of a rotatable adjustment device which is stationary when the drive shaft is driven, and the upper end portion of the drive shaft being axially displaceably mounted in a guide bush, above which there is a holding device of the adjustment device, in which holding device a downwardly extending element is fixed comprising the working surface, and with a pendulum mechanism for generating a swivelling movement of the drive shaft.

Jig saws of the above-mentioned type, with a mechanism for opening and closing the holding device for the saw blade, are known in the art (WO 89/08524, EP 0 679 465 A1), and it is also known to equip a jig saw of such a design, particularly a jig saw comprising a mechanism for the operating saw blade holding device similar to that of FIGS. 7 and 8 of WO 89/08524, with a pendulum mechanism such as that which has already been known in the art for jig saws for a long time. By engaging either on the back of the saw blade located in the holder or directly on the drive shaft, this pendulum mechanism displaces the drive shaft, and consequently the saw blade, about a swivel or pivot axis, so that the saw-teeth of the saw blade move in the work piece along a type of orbital path, to thereby improve the effectiveness of the sawing operation.

In the case of the known jig saw, the oblong actuating section, normally composed of metal, for opening and closing the saw blade holder is located within the hollow drive shaft and the adjustment device element, likewise normally composed of metal, which comprises the working surface, projects into this hollow drive shaft. The end sections of the element comprising the working surface and of the actuating section are located opposite each other, for the purpose of effecting, in each stroke position of the drive shaft, engagement of the working surface of the adjustment device with the engagement surface of the actuating section and thus permitting opening and/or closure of the saw blade holder.

Since, in sawing operation, the drive shaft, together with the saw blade holder provided thereon, reciprocates in the longitudinal axis of the drive shaft while the adjustment device, and consequently, its element comprising the working surface are stationary, the regions of the engagement surface and the working surface which lie opposite each other are displaced relative to each other. This does not constitute a problem as long as these faces are not mutually engaged during the sawing operation or, alternatively, at least, slide flatly over each other. If, in the case of the known saw, however, the pendulum mechanism is activated, this results in the above-mentioned swivelling of the drive shaft and also, consequently, in the swivelling of the position of the engagement surface of the actuating section, while the alignment of the adjustment device element comprising the working surface remains unchanged. This results in an intensified engagement between the engagement surface and the working surface and, in particular, in a marked line contact, due to the fact that the actuating section is tilted out of its parallel alignment with the working surface of the adjustment device by the pendulum movement. Due to the high stroke frequency of the drive shaft, this results in a considerable generation of heat, by which affected parts can be damaged. The heat generated can even be so high that the actuating section welds to the adjustment device element comprising the working surface, so that the jig saw becomes unusable.

SUMMARY OF THE INVENTION

The object of the invention is to improve a jig saw of the type stated at the beginning in such a way that the risk of overheating of the actuating section and the adjustment device element comprising the working surface is prevented.

To achieve this object, a jig saw of the type stated at the beginning is designed, according to the invention, in such a way that the guide bush, for the purpose of accommodating the swivelling or pivoting movement of the drive shaft generated by the pendulum mechanism, is pivotally mounted within the housing and so that the holding device is supported on the guide bush and held in engagement therewith by spring force.

In the jig saw according to the invention, therefore, when the pendulum mechanism is in operation, there is effected a swivelling movement of the drive shaft together with the guide bush which retains and guides the upper end portion of the drive shaft, while the holding device constituting a part of the adjustment device is supported on this guide bush and is held in continuous engagement therewith, so that the holding device follows all swivelling movements of the drive shaft. Consequently the adjustment device element which comprises the working surface and which is fixed within the holding device also follows these swivelling movements of the drive shaft and therefore always remains in an unchanged alignment relative to the engagement surface of the actuating section effecting the opening and closing of the saw blade holder. The relative swivelling of the drive shaft and the adjustment device which occurs in the known saw and causes overheating in the sawing operation therefore does not occur. On the contrary, due to the maintenance of the accurate alignment of the engagement surface of the actuating section and the working surface of the adjustment device in each operating state of the saw, heating in this region is minimised. There is therefore no risk of damage due to overheating, or even welding together of the parts moving relative to one another.

The holding device preferably includes an annular region which bears on the guide bush to thereby achieve a flat and stable support over the entire perimeter.

In order to align the holding device and the guide bush relative to each other and also retain them in this aligned position during the pendulum operation, the upper end portion of the guide bush and the lower end portion of the holding device may be surrounded by a bush of elastically deformable material, such as rubber, inserted into a housing wall opening. This bush performs the function of alignment and also, through its deformability, renders possible the swivelling movements relative to the adjacent housing wall.

The holding device may include a shoulder, projecting radially outwards, with which there engages a spring, generating the spring force, which is supported on a fixed housing portion.

The spring is preferably supported on diametrically opposing areas of the shoulder, these areas being located on a straight line normal to the plane of the pendulum movement. In this way, the support is provided in the areas of the shoulder which execute the least displacement movement in the pendulum operation.

BRIEF DESCRIPTION OF THE DRAWINGS

The invention is described more fully below with reference to the figures which depict an embodiment.

DETAILED DESCRIPTION OF THE PREFERRED EMBODIMENTS

Figure 1:
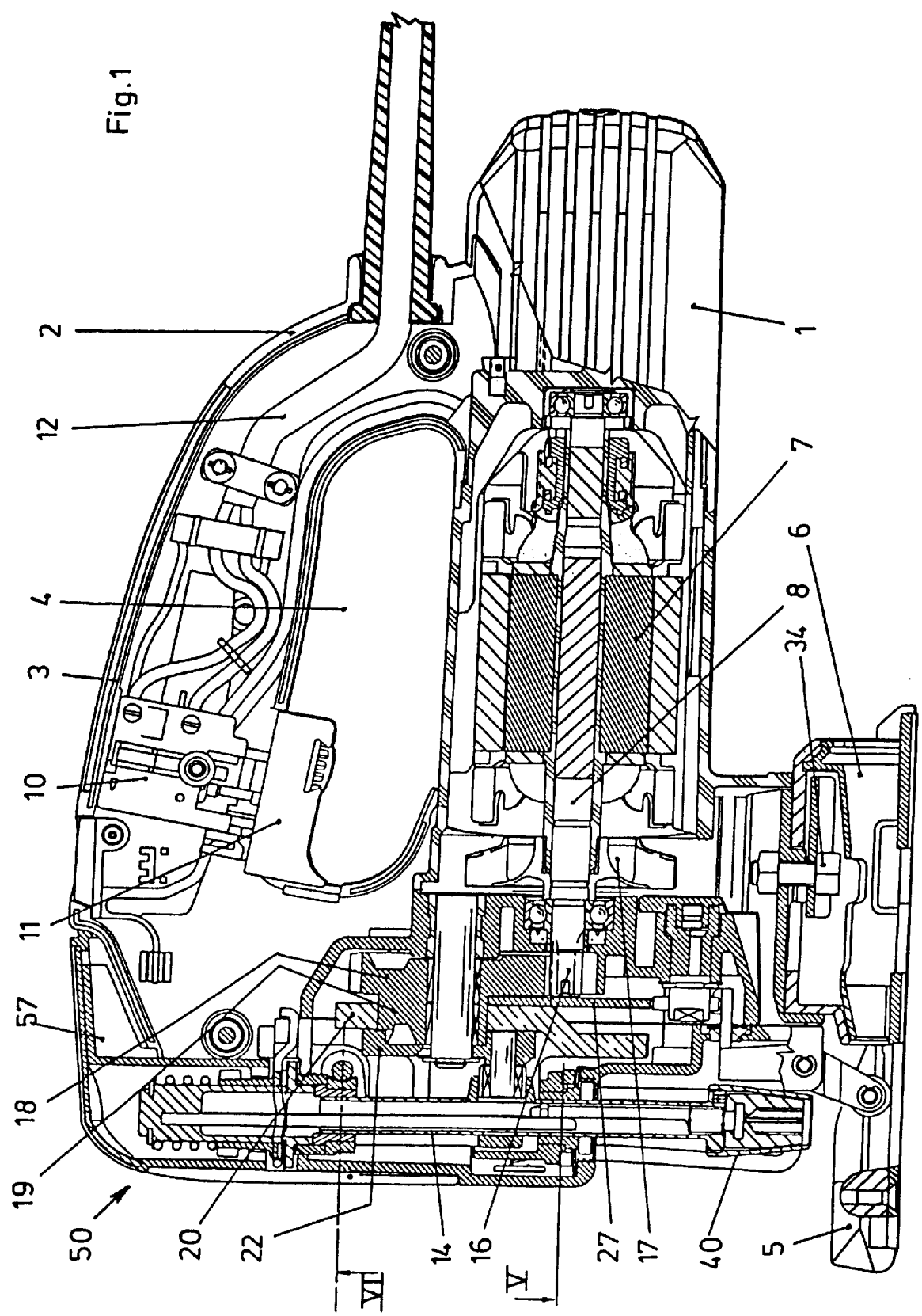
FIG. 1 shows an electrically driven jig saw, partially in section and partially as a view.

The depicted jig saw has a housing consisting of two half-shells 1, 2, which are screwed together in the usual manner and form a handle portion 3 and a handle opening 4 located underneath this handle portion. Within the housing there is an electric motor 7 which can be connected to a power source through a connecting cable 12 and a normal switch 10, which can be activated by means of the trigger element 11. Mounted on the front end of the housing 1, 2 is a housing part 33. A second housing part 38 is located adjacent the inboard surface of the housing part 33 to thereby form an enclosure. A drive shaft 14 is retained in an upper guide bush 30 and a lower guide bush 35 so as to be capable of reciprocal movement in the direction of its longitudinal axis within this housing part, the drive shaft carrying at its lower end a holder or clamp 40 for a saw blade. Underneath the drive shaft 14, a conventional shoe 5 is connected to the housing through an arcuate portion 6 by means of a screw 34, this type of arrangement providing, in the known manner, for oblique positioning of the shoe 5 for the execution of bevel cuts.

For driving the drive shaft 14, a pinion 16 provided on the front end of the armature shaft 8 of the electric motor 7, the armature shaft carrying a fan 17, meshes with a toothed wheel 18 which is rotatably mounted on a non-rotatable axle 21 which extends spaced from and parallel to the armature shaft 8. A plate-like eccentric element 22 is non-rotatably attached to the front of the toothed wheel 18, which element carries an eccentric pin 23 located eccentrically relative to the axle 21. A ball bearing is fixed in the usual manner to the front end of the eccentric pin 23 which bearing engages with a transverse guide 24 fixed to the drive shaft 14. Thus, with this structure, which is conventional for jig saws, a rotation of the toothed wheel 18 caused by the rotation of the armature shaft 8 results in a revolving of the eccentric pin 23 around the axle 21, so that the ball bearing of the eccentric pin 23 moves back and forth in the transverse guide 24 and causes a reciprocating movement of the drive shaft 14 in the direction of its longitudinal axis.

The toothed wheel 18 includes a forwardly directed section 19 forming a circumferential surface which is disposed eccentrically with respect to the axle 21. A balancing weight 20 is seated on the circumferential surface so that the latter engages with an oblong through-opening (not shown) of the balancing weight 20. The balancing weight 20 is guided laterally on the housing so that, upon rotation of the toothed wheel 18, it executes a reciprocating movement in parallel to the reciprocating movement of the drive shaft 14 in the conventional manner, due to the eccentric circumferential surface of the section 19 of this toothed wheel. As is usual in the case of jig saws of this type, this reciprocating movement is effected with a 180 angular displacement relative to the reciprocating movement of the drive shaft 14, i.e., when the drive shaft 14 moves downwards, the balancing weight 20 moves upwards. In this way, vibrations produced by the reciprocating movement of the mass of the drive shaft 14 and its associated elements, including the inserted saw blade, are essentially compensated.

Figure 2:
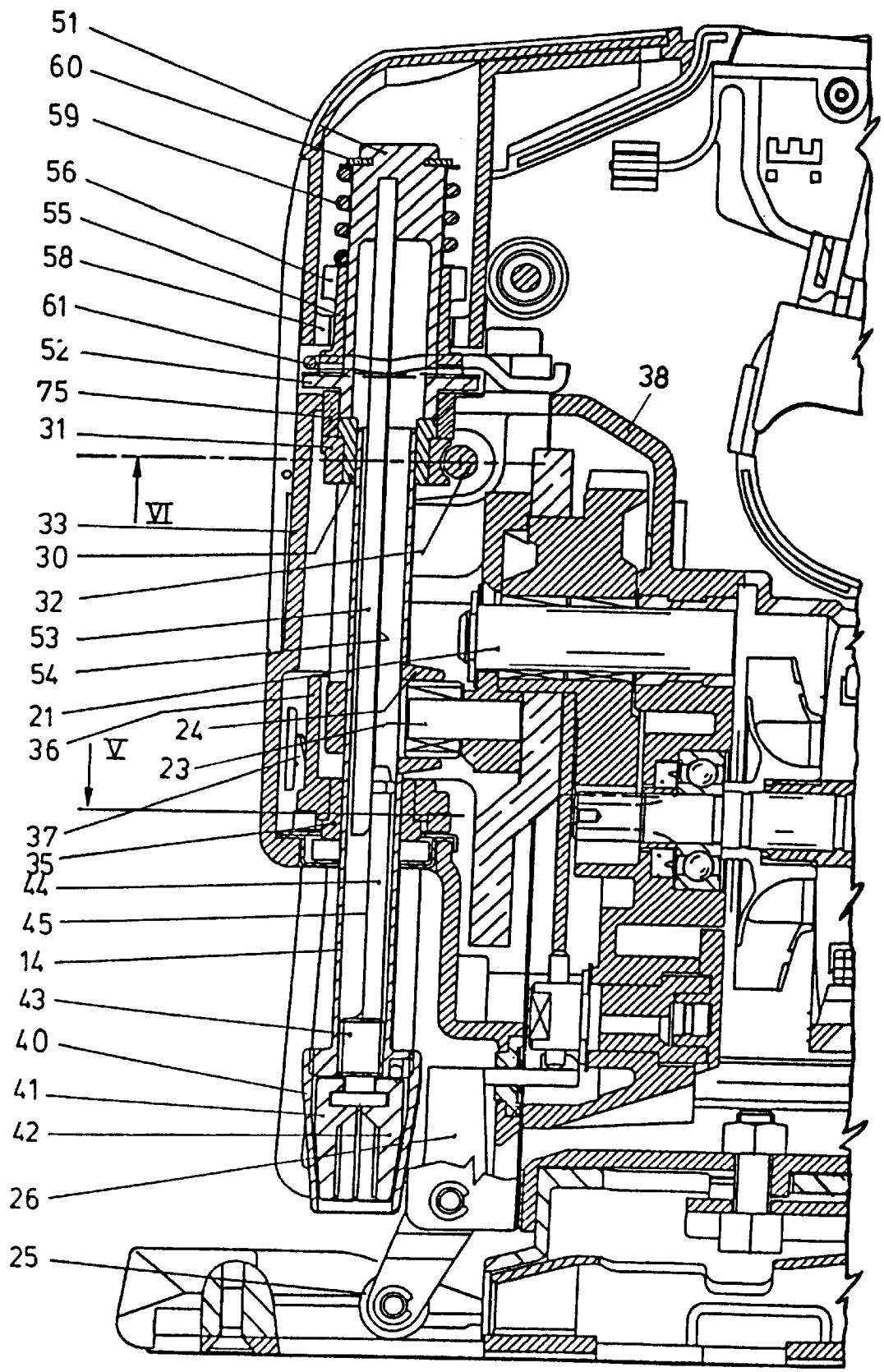
FIG. 2 shows, in section, the front part of the jig saw of FIG. 1, enlarged relative to FIG. 1.
Figure 4:
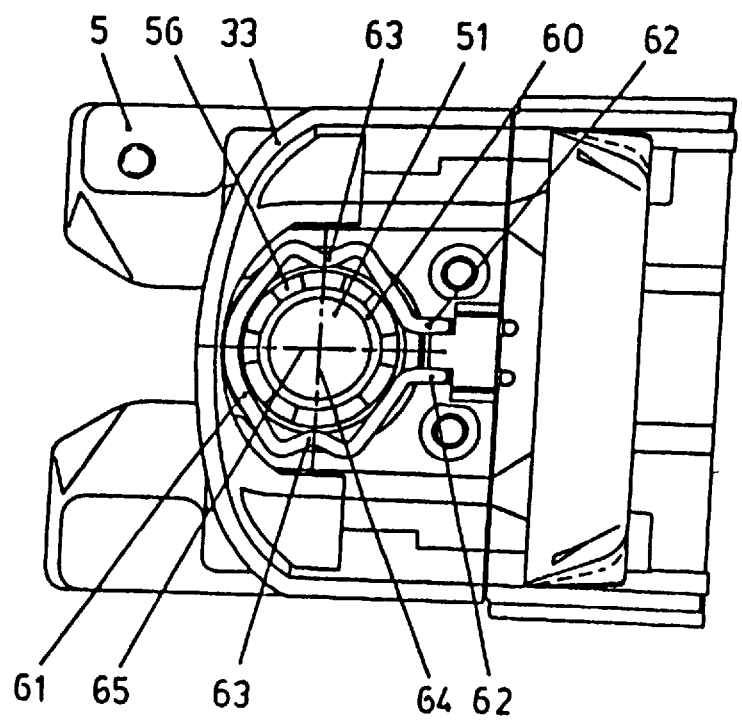
FIG. 4 shows, as a top view, the front part of the jig saw according to FIGS. 1 to 3, the adjustment part being omitted.

The embodiment shown is a so-called pendulum jig saw comprising a conventional pendulum mechanism comparable to that of U.S. Pat. No. 4,238,884. This has a supporting roller 25 which, in operation, bears on the back of the saw blade fixed in the clamp 40 and is retained by a lever arrangement 26 which is pivotally fixed within the housing. Acting on the lever arrangement 26 in the known manner upon rotation of the toothed wheel 18 is a stroke disc 27 which impinges on the upper horizontal section of the lever arrangement 26 and thus generates the normal pendulum movement by which the drive shaft 14, and consequently the saw blade, swivels in the plane of projection of the FIGS. 1 and 2, i.e., in the plane 65 (FIG. 4), as well as about the axle 32, adjacent to the upper guide bush 30, against the force of a spring 37 and is swivelled back again by the spring force. The lower guide bush 35 is located within a retaining part 36 which is formed with an upper extension in engagement with the spring 37.

The clamp or holder 40 at the lower end of the drive shaft 14 and the adjustment device 50 for moving the clamp 40 between an open position and a closed position for mounting the saw blade is similar to that of EP 0 679 464 A1.

The clamp 40 includes clamping jaws 41, 42, between which the saw blade is inserted and which engage with and clamp the saw blade through downward movement by means of the actuating section 43, 44, thereby fixing the saw blade in the holder 40. The actuating section has a threaded section 43 which engages with a thread at the lower end of the drive shaft 14, and a section 44 extending upwards from the threaded section 43 in the tubular drive shaft 14, which is open at the upper end, and having a planar engagement surface 45.

Figure 2A:
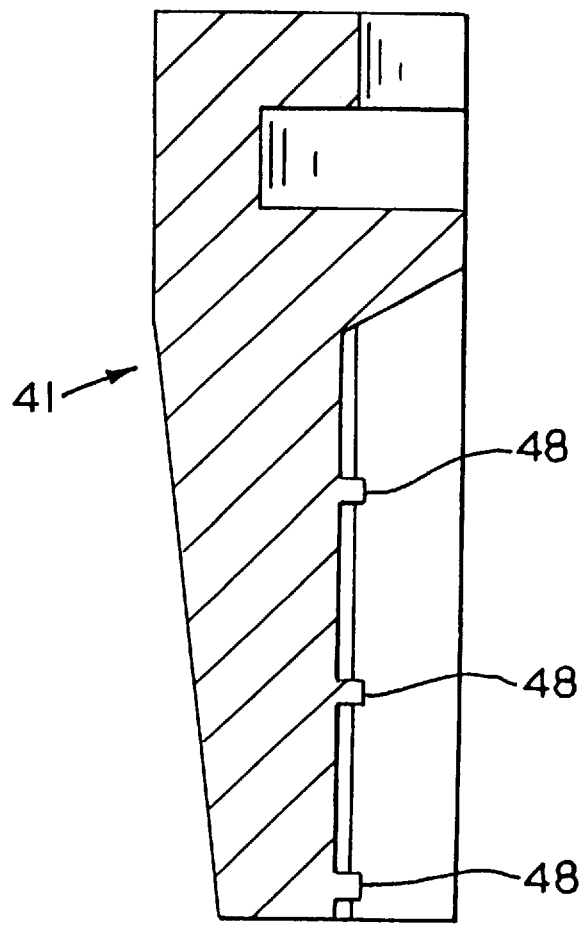
FIG. 2a shows an enlarged sectional view of a single clamping jaw in an alternative embodiment to the one shown in FIG. 2.
Figure 6:
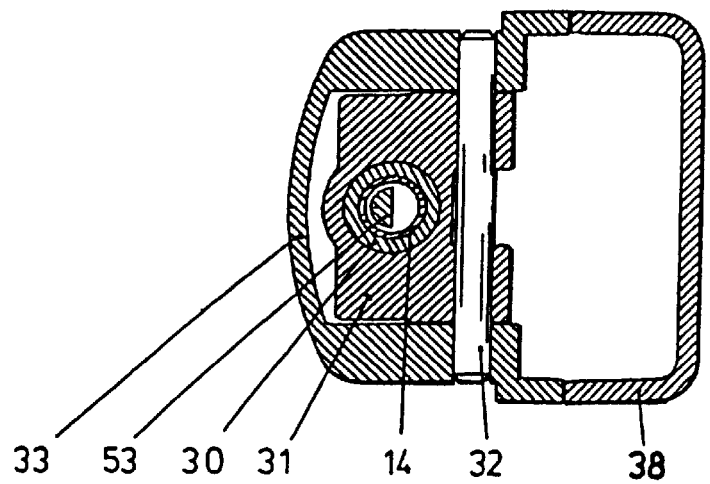
FIG. 6 shows a partial section along the line VI of FIG. 2.
Figure 3:
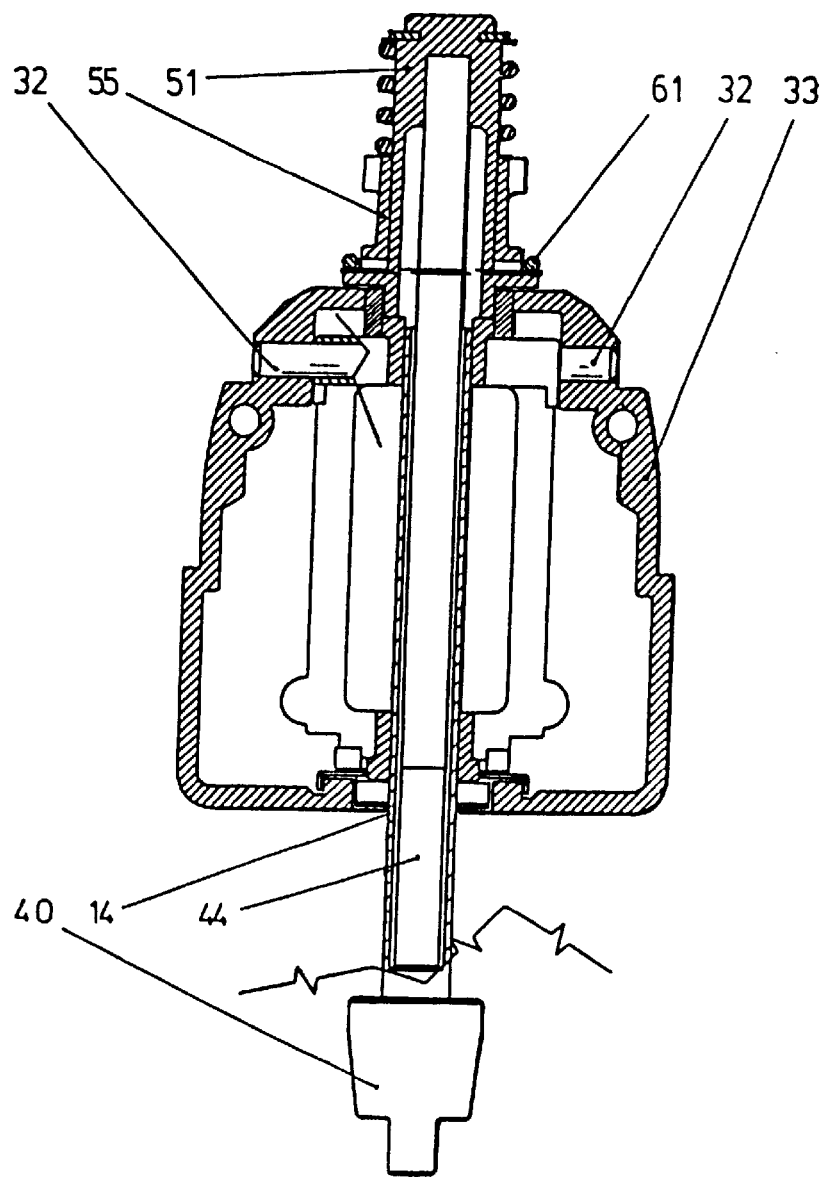
FIG. 3 shows the jig saw of FIGS. 1 and 2 from the front, partially in section and partially as a view.
Figure 5:
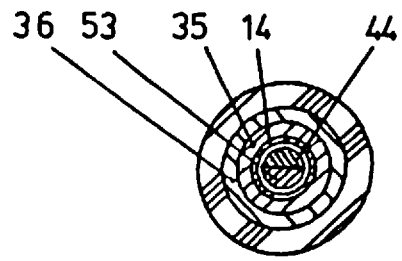
FIG. 5 shows a partial section along the line V of FIG. 2.

In an alternative embodiment the clamping jaws may be provided with teeth or ridges 48, as shown in FIG. 2a for a single clamping jaw 41. The clamping jaw 42 is likewise provided with ridges. The ridges 48 are preferably located across recessed opposing faces of the clamping jaws which engage the opposing side edges of a saw blade being clamped between the jaws. The use of the teeth 48 reduces the surface area of the jaws 41, 42 that engage the side edges of the saw blade. This increases the pressure with which the blade is clamped. Advantageously the ridges 48 are arranged so that, when the clamping jaws 41, 42 are closed to clamp a saw blade therebetween, they are forced into the side edges of the saw blade, thereby slightly deforming the side edges and forming recesses therein. The engagement of the ridges 48 with the recesses in the saw blade side edges provides a keying function which secures or locks the clamped saw blade against axial movement within the clamp.

The adjustment device 50 is disposed essentially above the upper guide bush 30 and comprises a cup-type or bush-type holding device 51 having an outwardly directed annular shoulder 52. A coupling bush 55 comprising outwardly directed teeth or projections 56 and pressed into a lower position by a helical spring 59 which is supported on a disc 60, is non-rotatably but axially displaceably fixed on the outside of the holding device 51. A lower region of an adjustment part 57 whose form matches the shape of the housing extends over the upper part of the holding device 51 and comprises, at its lower end, inwardly directed teeth or projections 58 which are located in the position shown below the teeth or projections 56 of the coupling bush 55. Fixed within the interior of the holding device 51 so as to be incapable of displacement within the latter is a rod-shaped element 53 extending downwards into the tubular drive shaft 14. The rod-shaped element 53 forms a planar working surface 54 and the lower section of the rod-shaped element 53 lies opposite to the upper end portion of the section 44 of the actuating section over a certain axial length, so that portions of the engagement surface 45 of the actuating section 43, 44 and of the working surface 54 of the rod-shaped element 53 lie opposite each other.

If the adjustment part 57 is drawn upwards by the user so that its teeth or projections 58 mesh between the teeth or projections of the coupling bush 55, rotation of the adjustment part 57 results in a rotation of the coupling bush 55, and consequently of the holding device 51 of the adjustment device 50. This effects a rotation of the rod-shaped element 53 which thereby executes an orbital movement within the interior of the tubular drive shaft 14, its working surface 54 abutting on the engagement surface 45 of the section 44 of the actuating section and causing the latter likewise to execute an orbital movement. The threaded section 43 of the actuating section is thereby rotated and, in this way, a displacement of the clamping jaws 41 is effected in accordance with the rotation effected, upwards or downwards, i.e., in the direction of the closed position or in the direction of the open position. The adjustment part 57 is then moved back into the position shown in FIGS. 1 and 2.

As mentioned above, in operation the pendulum mechanism causes the drive shaft 14, and consequently the saw blade mounted in the clamp 40, to swivel or pivot about the axle 32 which is mounted in the housing part 33 and pivotally retained in the latter at its opposing ends. Fixed to the axle 32 there is a retaining part 31 which accommodates the upper guide bush 30 so that the latter swivels together with the retaining part 31 when the drive shaft 14 swivels about the axle 32.

The lower annular end of the holding device 51 is supported on the upper end face of the upper guide bush 30 and is held in this engagement position by a spring stirrup 61. As shown particularly in FIG. 4, the spring stirrup 61 encloses the holding device 51 and its ends 62 are supported in portions of the housing. Downwardly directed regions 63, which are disposed diametrically opposite to each other and located on a straight line 64 which extends perpendicularly to the plane 65 in which the pendulum movement occurs, are located on the annular shoulder 52 of the holding device 51. In this way, the pressure forces generated by the spring stirrup 61 are transferred to the region of the holding device 51 which on the one hand lies centrally relative to the holding device 51 and the upper guide bush 30 and which on the other executes the least swivelling movements.

The upper end of the guide bush 30 and the lower end of the holding device 51 are tightly surrounded by a bush 75 made from rubber or a similar elastically deformable material and are held by the latter in alignment relative to each other. The bush 75 extends through a housing wall opening and, because of its elastic deformability, does not hinder the swivelling movements of the upper guide bush 30 and the holding device 51 but follows them, by elastic deformation, in the regions of contact with the housing wall.

As is clearly evident, during the reciprocating movement of the drive shaft 14 in the operation of the saw, there is produced a reciprocating movement of the section 44 of the actuating section for the clamp 40 relative to the stationary element 53 of the adjustment device 50. The engagement surface 45 and the working surface 54 normally glide easily on one another. Whereas this does not in practice constitute a problem in the normal sawing operation, without the pendulum movement, the structure described prevents the section 44 and the rod-shaped element 54, and consequently the engagement surface 45 and the working surface 54, from canting towards each other in pendulum operation and thus prevents a significant increase in friction with resultant heating, since the holding device 51 of the adjustment device 50 is always held in a supported position on the upper guide bush 30. Due to this support, it follows the swivelling motions of the upper guide bush 30 which occur in the pendulum operation and the rod-shaped element 53 fixed within it remains in the same alignment relative to the section 44 of the actuating section for the clamp 40, as is the case in operation without activation of the pendulum mechanism, i.e., heating in the region of engagement of the engagement surface 45 with the working surface 54 is avoided.

It is claimed:

1. A jig saw comprising:

a housing having a front end;

a guide bush pivotally mounted in housing;

a drive shaft adjacent to the front end of the housing and having a longitudinal axis, a lower end and an upwardly open, tubular end portion reciprocally movably supported in the guide bush;

a holder connected to the lower end of the drive shaft and having an open position for insertion and removal of a saw blade and a closed position for holding a saw blade;

a drive motor coupled to the drive shaft for reciprocally driving the drive shaft along the longitudinal axis;

an actuator section for opening and closing the holder comprising an engagement surface in the tubular end portion of the drive shaft;

a rotatable adjustment device maintaining an axially stationary position when the drive shaft is reciprocated and comprising:

a holding member located above, supported by and spring biased into engagement with the guide bush; and a downwardly extending element mounted in the holding member and having an actuator surface engageable with the engagement surface for rotation of the actuator section; and a pendulum mechanism connected between the drive shaft and the drive motor for pivoting the drive shaft.

2. The jig saw of claim 1 wherein the holding member engages with an annular area of said guide bush.

3. The jig saw of claim 1 wherein an upper end portion of said guide bush and a lower end portion of said holding member are enclosed by a sleeve of elastically deformable material inserted into a housing wall opening.

4. The jig saw of claim 1 wherein:

the holding member comprises a radially outwardly projecting shoulder; and the holding member is spring biased into engagement with the guide bush by a spring supported by a fixed housing portion and engaged with the shoulder of the holding member.

5. The jig saw of claim 4 wherein:

the spring which is supported by the fixed housing portion engages with diametrically oppositely located areas of said shoulder; and the areas are located on a straight line normal with respect to the plane of the pendulum movement.

6. The jig saw of claim 1 wherein the holder comprises:

two clamping jaws having opposing faces; and clamping ridges formed on the faces and engageable with a blade to clamp the blade.

7. The jig saw of claim 6 wherein the clamping ridges engage with the blade and form recesses in opposing side edges of the blade when the blade is clamped between the clamping jaws.

* * * * *